United States Patent [19]

Gammie et al.

[11] Patent Number: 4,982,050
[45] Date of Patent: Jan. 1, 1991

[54] NATURAL GAS TREATING SYSTEM INCLUDING MERCURY TRAP

[75] Inventors: Douglas J. Gammie, Cherry Hill, N.J.; Tsoung Y. Yan, Philadelphia, Pa.

[73] Assignee: Mobil Oil Corporation, Fairfax, Va.

[21] Appl. No.: 224,595

[22] Filed: Jul. 25, 1988

Related U.S. Application Data

[63] Continuation-in-part of Ser. No. 915,598, Oct. 6, 1986, abandoned.

[51] Int. Cl.⁵ .................. B01D 8/00; B01D 45/08; C07C 7/00
[52] U.S. Cl. .................... 585/818; 55/69; 55/72; 55/97; 55/DIG. 15; 423/210
[58] Field of Search .............. 423/210; 55/97, 69, 55/72, DIG. 14, DIG. 15; 62/18, 23, 55.5; 585/818, 950

[56] References Cited

U.S. PATENT DOCUMENTS

| | | | |
|---|---|---|---|
| 1,535,157 | 4/1925 | Hughes et al. | 62/55.5 |
| 2,317,814 | 4/1943 | Schuchmann et al. | 55/DIG. 15 |
| 3,193,987 | 7/1965 | Manes et al. | 423/210 |
| 3,693,323 | 9/1972 | Gant | 55/72 |
| 3,780,534 | 12/1973 | Lofredo et al. | 62/18 |
| 3,817,713 | 6/1974 | Ionescu | 423/210 |
| 3,956,458 | 5/1976 | Anderson | 423/210 |
| 4,070,165 | 1/1978 | Colton | 62/18 |
| 4,094,777 | 6/1978 | Sugier et al. | 55/74 |
| 4,101,631 | 7/1978 | Ambrosini et al. | 423/210 |
| 4,419,107 | 12/1983 | Roydhouse | 423/210 |
| 4,676,807 | 6/1987 | Miller et al. | 55/97 |

FOREIGN PATENT DOCUMENTS 2310795  5/1975  France .

OTHER PUBLICATIONS

Chemical Engineers' Handbook, 5th ed. Perry et al., eds. McGraw-Hill Book Co. 1973, pp. 18-82 to 85.

Primary Examiner—Jeffrey E. Russel
Attorney, Agent, or Firm—Alexander J. McKillop; Charles J. Speciale

[57] ABSTRACT

A method and system for mechanically removing mercury from natural gas are provided. A mercury trap is positioned at substantially the coldest point in the system before a main heat exhanger. The trap includes a bend in the natural gas flow path, baffles, a demister and/or a perforated cylinder for changing the direction of the flow path and causing mercury to be deposited therein.

8 Claims, 3 Drawing Sheets

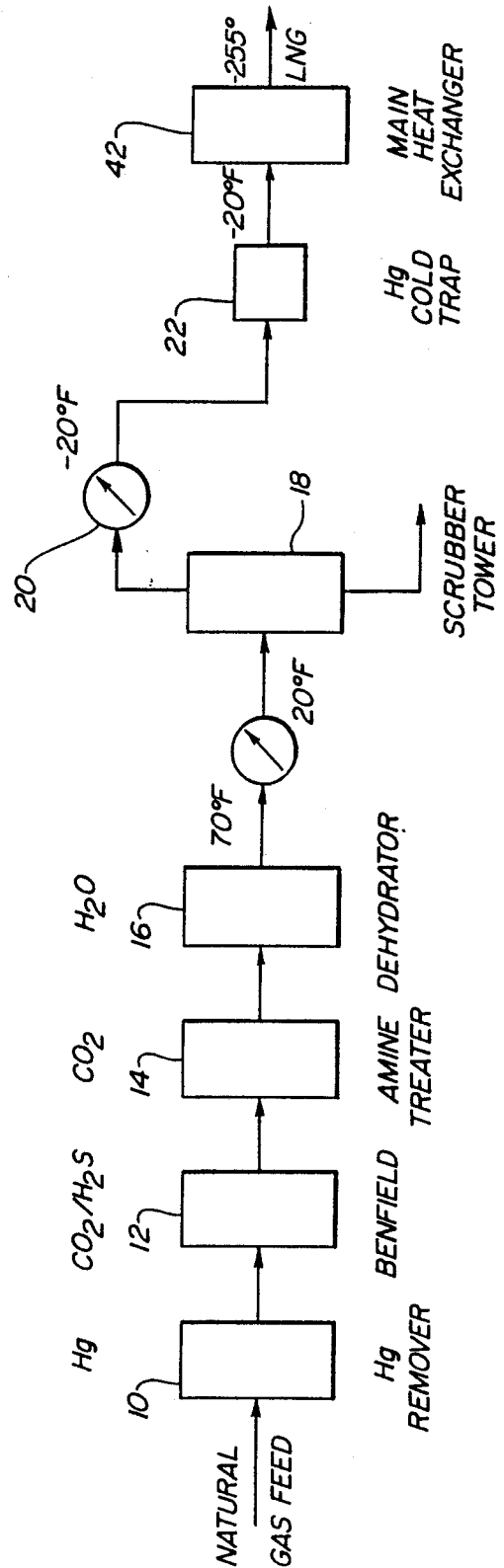

though the concentration of mercury appears low, its effect is cumulative as it amalgamates with the aluminum. The result is damage to the system, such as corrosion and stress cracking, which can lead to equipment failure, fires, and similar catastrophe. Repair of the aluminum heat exchangers damaged by mercury is almost impossible. Replacement of the heat exchangers represents a large expenditure. The down-time results in loss of product production. The problem of mercury in natural gas is discussed further in U.S. Pat. No. 4,094,777 and French Pat. No. 2,310,795, both of which are incorporated herein by reference.

SUMMARY OF THE INVENTION

Accordingly, one object of this invention is to remove the mercury present in natural gas to a concentration sufficiently low to avoid mercury damage to liquefaction equipment, such as the aluminum heat exchangers, in a liquefied natural gas plant. Another object is to minimize the release of mercury vapors into the environment.

Still another objective is to provide a process for mercury removal which can be integrated into current gas and liquid purification systems at existing LNG plants.

Still another objective is to provide a process for mercury removal which requires no scrubbing or other comparable treatment to satisfactorily reduce the mercury content of natural gas.

A natural gas feed containing mercury is flowed through a series of treating steps designed to remove carbon dioxide, mercaptans, hydrogen sulfide, etc., then through a cooling step and finally through a cold trap wherein mercury vapor is condensed out on the surface of the trap and collected in the bottom thereof. In accordance with the invention, the cold trap is installed at substantially the coldest location before the main heat exchanger. It mechanically traps the mercury as the gas flows therethrough. A demister, baffles and/or static mixer may be employed within the trap to improve the efficiency thereof. The surfaces of the trap may include materials which amalgamate with mercury to further improve efficiency. The treated gas is then passed on to a heat exchanger and other liquefaction steps. The invention described herein is particularly useful for removing break-through mercury present due to malfunction of the other upstream mercury-removal units.

BRIEF DESCRIPTION OF THE DRAWINGS

FIG. 1 is a schematic illustration of a system for treating natural gas in accordance with the invention.

DETAILED DESCRIPTION OF THE INVENTION

Figure 2A:
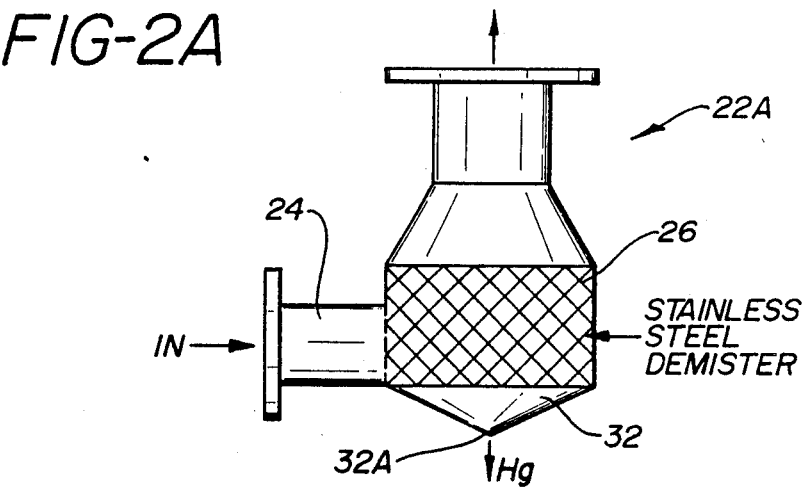
FIGS. 2A-2D illustrate four mercury traps according to the invention which may be employed in the system shown in FIG. 1.

As shown in FIG. 1, the natural gas to be treated is first contacted in a treating bed 10 with an agent designed to remove the bulk of the mercury contamination. This treating zone can be a bed filled with a sorbent material such as silica, alumina, silica-alumina, or activated carbon having deposited on the surfaces thereof an active form of elemental sulfur.

The gas in this section of the treating zone loses much of its mercury content by virtue of the reaction between the mercury and the sulfur to form mercuric sulfide. The effluent gas therefrom is then carried through conventional Benfield and amine-treating units 12 and 14 to remove carbon dioxide and sulfides present in the gas. The effluent gas from this portion of the treatment is then flowed into a dehydrator 16 where the moisture content of the gas is reduced to a desired level.

The gas is chilled and then conducted through a scrubber tower 18 where it is scrubbed with a liquefied $C_3$-$C_5$ hydrocarbon to remove certain hydrocarbon fractions. The effluent therefrom flows through a conduit into a cooler and chiller 20 and subsequently into a cold trap 22. The cold trap operates at a temperature between 100° F. and −100° F. It includes mechanical means, such as a bend formed therein, or baffles or the like for changing the direction of flow of the natural gas stream, thereby causing the heavier mercury particles to impinge upon and deposit on flow deflecting surfaces in the trap. The mercury is retained in the trap as the effluent gas stream is carried on to the liquefaction process. The gas flowing to the liquefaction process is a gas substantially reduced in mercury content. The problems associated with mercury on aluminum, brass or copper surfaces present in the liquefaction portion of the system are accordingly alleviated.

It is particularly preferred to position the cold trap at the coldest point available in the process sequence prior to flowing the gas stream through aluminum piping or the main heat exchange equipment. At this temperature, at least some of the mercury in the gas stream is condensed to form a mist. When the gas flow is mechanically deflected at a sufficiently low temperature, such as about $-30°$ C., the relatively high-density mercury particles are trapped while the lower density portions of the gas stream pass through to the heat exchanger 42. In addition, the surfaces in the trap appears to adsorb mercury vapor and promote condensation of mercury, leading to surprisingly effective mercury removal from the gas.

Figure 2B:
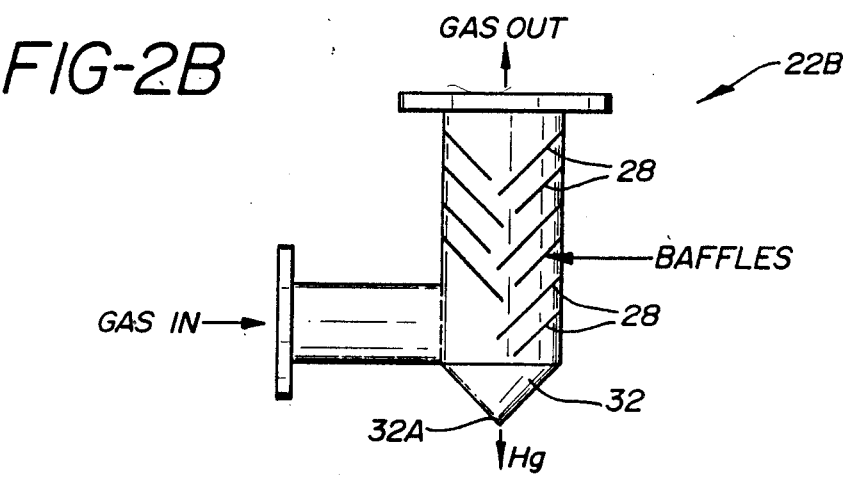

FIGS. 2A-2D show various types of traps which may be utilized in the process. FIG. 2A shows a trap 22A including a conduit 24 having a right angle bend filled or partially filled with a stainless steel or other type of metal gauze or packing. The gauze functions as a demister 26 and provides a large surface area and tortuous pathway for effective mercury removal. FIG. 2B depicts a trap 22B including a series or plurality of baffles 28 which project from the walls of the trap and away from the main heat exchanger, thereby providing surfaces on which the impinged gas deposits mercury. Many of the baffles extend beyond the longitudinal axis of the trap, thereby causing the gas to travel through a tortuous pathway.

Figure 2C:
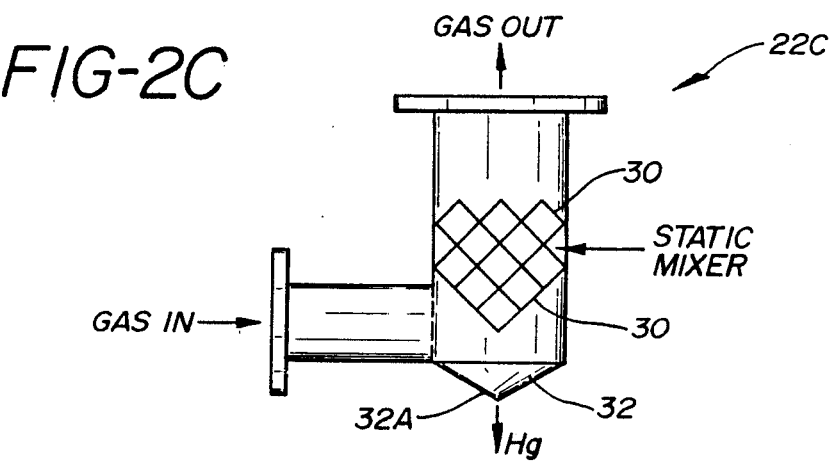

The trap 22C shown in FIG. 2C schematically illustrates a configuration including a static mixer wherein a series of baffles 30 are arranged to intersect each other so that the gas entering at one end becomes sufficiently turbulent to impinge upon the surfaces of the baffles and deposit mercury thereon. The baffles are positioned within a substantially ninety degree bend defined by the trap. Static mixers have conventionally been employed for simple blading operations and heat transfer operations. Mixing is achieved without the use of moving parts.

Each of the traps shown in FIG. 2A-2C includes a collector 32 defined beneath such a bend where the mercury can be collected and/or removed. A drain 32A is provided at the bottom of the collector. The trap is preferably located adjacent to the inlet of the main heat exchanger regardless of which trap construction is employed.

The surfaces of the various traps may be made of or covered with a metal which will react (amalgamate) with the mercury particles deposited on the trap surfaces to improve its mercury trapping efficiency. Such metals include gold, bismuth, copper, brass, silver, aluminum, tin and zinc. Tin is particularly preferred. The trap itself should be constructed from stainless steel or other such material which is resistant to mercury corrosion.

Figure 2D:
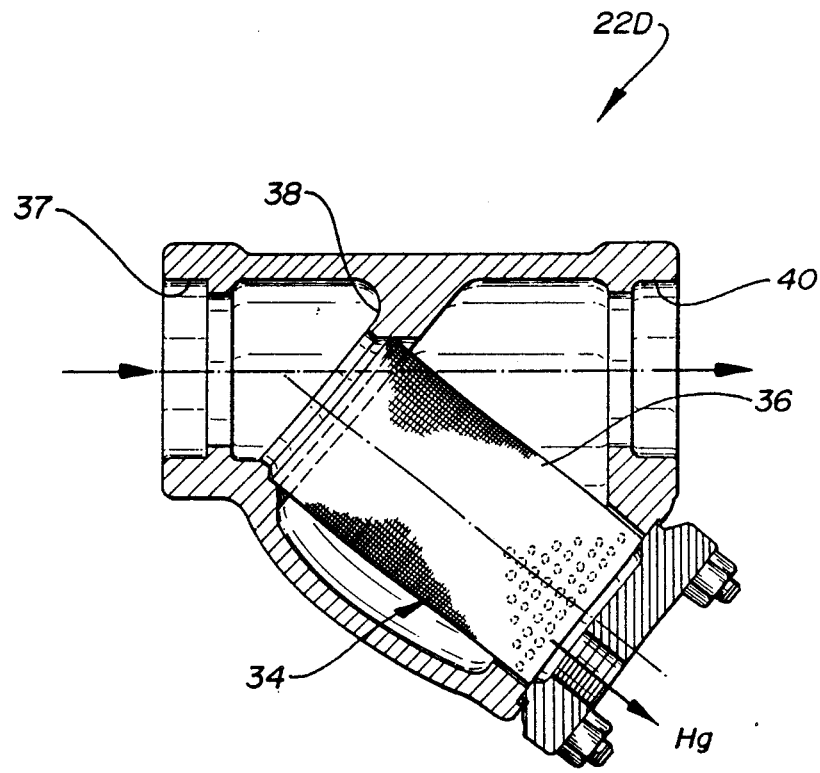

FIG. 2D depicts another mercury trap 22D which can be used in accordance with the invention. It is sometimes referred to as an "Armstrong" strainer. In this embodiment, a perforated stainless steel cylinder 34 is provided. The perforated cylinder supports a cloth 36 of finely woven non-wetting plastic, e.g. Teflon or wire cloth. The cylinder 34 extends downwardly with respect to the gas inlet 37. A flow deflecting surface 38 is defined by an inner wall of the trap 22D and is positioned immediately above the cylinder 34. This causes turbulence in the gas stream entering the cylinder, which further encourages the deposition of the mercury particles on the trap and cylinder surfaces. As gas flows through the cloth supported by the perforated cylinder, mercury particles coalesce and fall to the bottom of the cylinder where they collect and can be removed as necessary. The gas exiting through the outlet 40 will thereby have a greatly reduced mercury content and is less harmful to the heat exchanger to which it is connected.

The trap is effective in removing mercury from the gas stream with a mercury content as low as 0.1 micrograms per cubic meter, depending on the temperature of the gas stream. This effectiveness is the result of providing a tortuous pathway through which the gas must travel, a large effective surface area against which the gas and mercury impinges, thereby causing mercury adsorption and condensation, and a reactive (mercury-amalgamating) surface. The internal structure of the trap may be modified to include one or more of the structures described in the figures. Alternatively, other types of trap impingement surfaces may be provided. Certain constructions such as column packings may be successfully employed within the trap in addition to or in place of the constructions shown and described herein.

What is claimed is:

1. A method of removing mercury from natural gas prior to its entry into a heat exchanger, comprising:
   providing a heat exchanger;
   providing a conduit for conveying natural gas to said conveying mercury-containing natural gas through said conduit to said heat exchanger;
   cooling said natural gas prior to its entry within said heat exchanger;
   providing a bend within said conduit at substantially the coldest point within said conduit; and
   causing said natural gas to flow through a tortuous pathway within said bend within said conduit, said natural gas changing direction within said bend and impinging upon at least one trap surface positioned adjacent to said heat exchanger and at said substantially the coldest point within said conduit prior to entering said heat exchanger, thereby trapping mercury contained in said natural gas.

2. A method as defined in claim 1 including the step of providing a demister at said substantially coldest point within said conduit.

3. A method as defined in claim 1 including the step of providing baffles at said substantially coldest point within said conduit.

4. A method as defined in claim 3 wherein said baffles extend from the conduit and are angled towards the direction of flow of said natural gas.

5. A method as defined in claim 1 including the step of providing a static mixer at said substantially coldest point within said conduit.

6. A method as defined in claim 1 including the step of reducing the moisture content of the natural gas prior to causing said natural gas to flow through said bend.

7. A method as defined in claim 1 including the step of contacting the natural gas with a treating bed to remove mercury therefrom prior to causing said natural gas to flow through said bend.

8. A method as defined in claim 1 wherein the temperature of said natural gas is about $-30°$ C. at said coldest point.

* * * * *